United States Patent [19]

Stewart

[11] Patent Number: 5,158,009

[45] Date of Patent: Oct. 27, 1992

[54] RACK APPARATUS FOR BARBECUING RIBS

[76] Inventor: Jeffrey D. Stewart, 248 S. Main St., Pennington, N.J. 08534

[21] Appl. No.: 818,794

[22] Filed: Jan. 9, 1992

[51] Int. Cl.$^5$ ............................................. A47J 43/18
[52] U.S. Cl. ....................................... 99/426; 99/394; 99/421 A; 211/181
[58] Field of Search ............... 99/426, 427, 430, 441, 99/388, 394, 419, 421 A; 126/332, 337 R, 25 R; 248/156; 211/181

[56] References Cited

U.S. PATENT DOCUMENTS

| | | | |
|---|---|---|---|
| 532,408 | 1/1895 | Wesley | 126/337 R |
| 553,363 | 1/1896 | Sickels | 99/427 |
| 691,833 | 1/1902 | Williamson | 99/426 |
| 1,766,572 | 6/1930 | Welch et al. | |
| 3,315,591 | 4/1967 | Elliott | 99/441 |
| 3,540,369 | 11/1970 | Brooks | 99/426 |
| 4,625,634 | 12/1986 | Kruper | 99/427 |
| 4,848,217 | 7/1989 | Koziol | 99/426 |

Primary Examiner—Philip R. Coe
Assistant Examiner—Randall Edward Chin
Attorney, Agent, or Firm—Mathews, Woodbridge & Collins

[57] ABSTRACT

A rack for cooking barbecued ribs includes a plurality of curved legs which generally conform to the shape of the ribs. The legs are welded perpendicularly to a single longitudinal member. A handle attached to the longitudinal member makes it possible to manipulate the rack. The length of the curved legs decreases as the distance from the handle increases, thereby giving the rack a tapered form. Ribs barbecued on the rack cook quickly and evenly due to the improved distribution and concentration of heat.

7 Claims, 6 Drawing Sheets

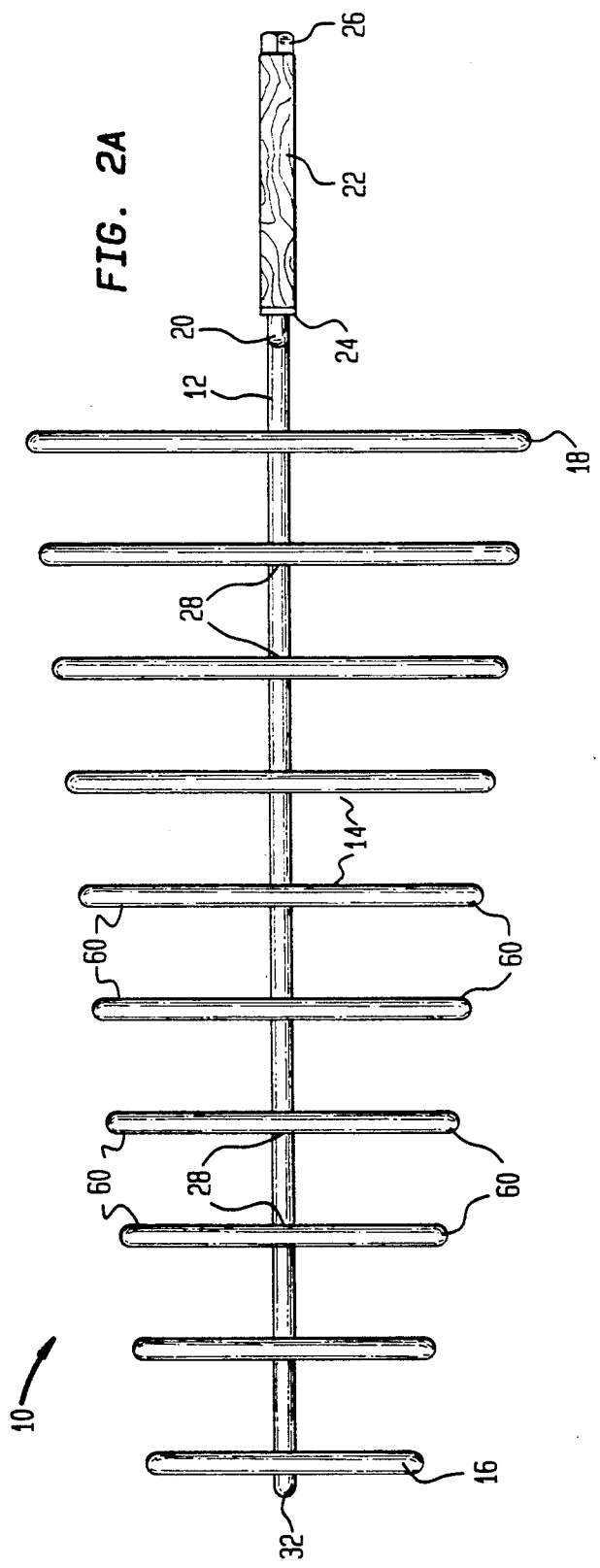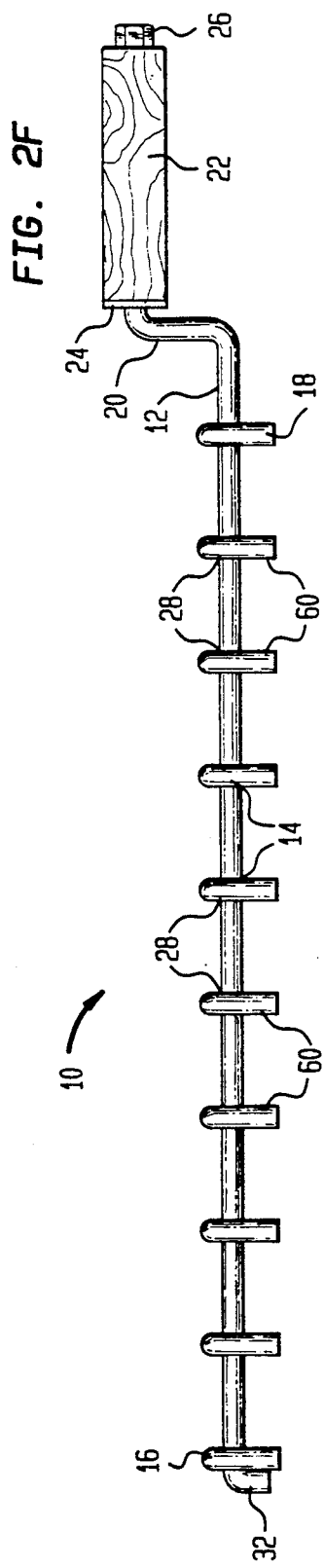

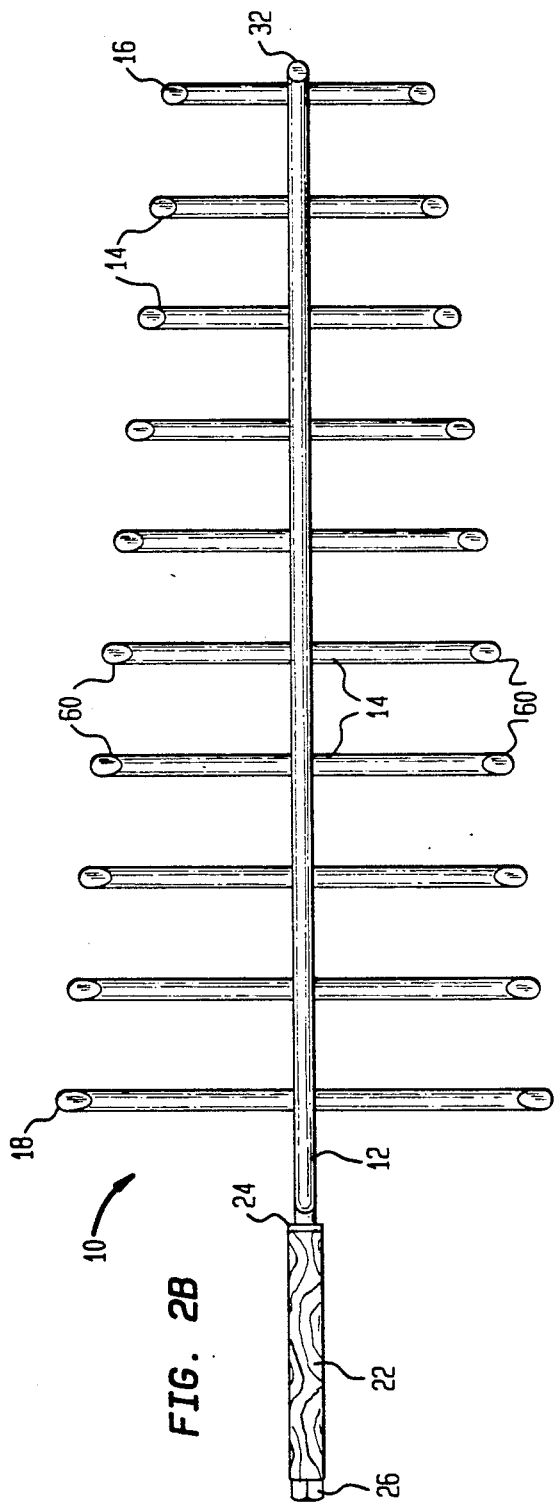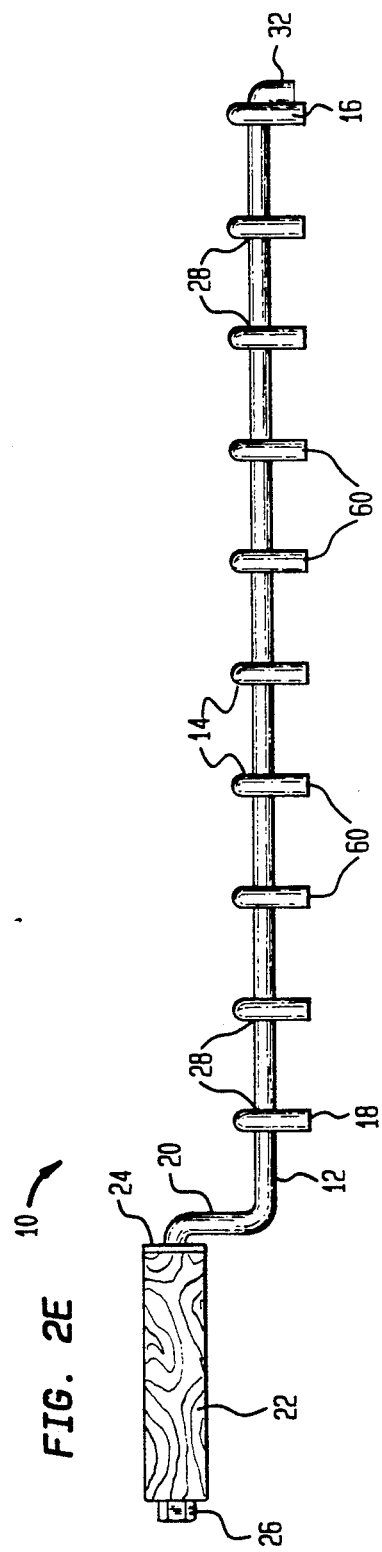
FIG. 2B
FIG. 2E

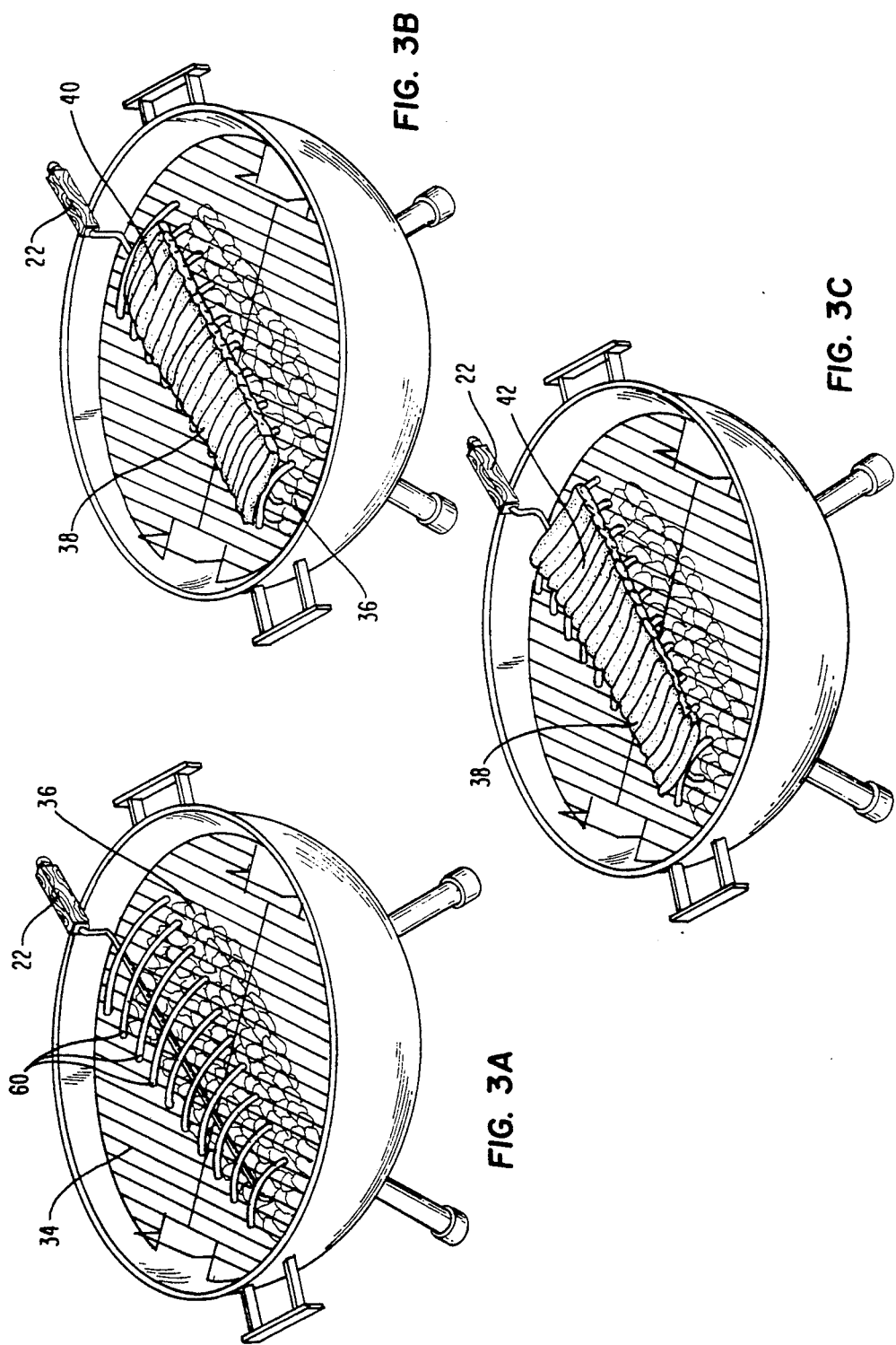

RACK APPARATUS FOR BARBECUING RIBS

BACKGROUND OF THE INVENTION

1. Field of the Invention

The invention relates to a rack for barbecuing ribs on a grill.

2. Description of Related Art

Cooking meat on a grill is an ancient technique that survives to modern times. Typically, ribs, chops, fish or poultry are placed on a flat grid that sits over an open flame. The heat from the flame is transmitted directly to the meat and indirectly through the grill itself which absorbs and radiates heat simultaneously.

In order to expedite the cooking process, specialty racks are employed for specific types of meat. One of the best known racks is the gridiron. A piece of meat, which may comprise salmon or barbecued ribs or the like, is placed between a pair of flat opposed grids, including metallic cross pieces, and placed over an open fire. Such devices are especially suitable for flat meat, but their utility is limited with respect to items that have a compound curved shape. A typical prior art gridiron is set forth in U.S. Pat. No. 1,766,572 issued on Jun. 24, 1930 to J.T. Welch, et al.

The problem of adequately cooking curved items has posed quite a challenge over the years. One of the most creative approaches is set forth in U.S. Pat. No. 3,540,369 entitled COOKING SUPPORT FOR SHRIMP issued to Holly Brooks Hice, on Nov. 17, 1970. The support includes a plurality of curved, parallel rods that undulate to mimic the curved underside of large shrimp. It is possible, using that device, to cook a large number of shrimp simultaneously. However, the device works on the assumption that the shape of all shrimp is essentially uniform. Such a support would not be satisfactory for cooking ribs where the shape of the ribs can vary considerably from cut to cut.

It was in the context of the foregoing prior art that the present invention arose.

SUMMARY OF THE INVENTION

Briefly described, the invention comprises a rack for barbecuing ribs over a grill. The rack preferably includes approximately ten curved pairs of legs welded perpendicularly to an extended, longitudinal member. An insulated, fire resistant handle is attached to one end of the longitudinal member. The curved legs decrease in length as their distance from the handle increases so as to give the rack a tapered shape. The taper of the rack makes it possible for the device to accommodate the generally tapered shape of the rib cut. Rib cuts are typically tapered in shape because the rib cage of the animal from which the ribs were taken has a generally tapered contour.

The ribs are typically first cooked by placing their concave side down on top of the convex surface of the rack. After that side of ribs has been adequately cooked, the ribs are inverted and placed upside down on the flat portion of the rack, thereby exposing the convex exterior of the ribs to the convex exterior of the rack. The spacing between the legs on the rack is preferably approximately the same as the spacing between the ribs on a butcher's cut so that the ribs of the cut approximately fall between the gaps of the legs on the rack.

According to the preferred embodiment of the invention, the legs come in pairs and each comprise a plurality of "C" shaped members welded perpendicularly to the top of the longitudinal member. Alternatively, it is also possible to individually weld each leg to the longitudinal member so that the plane of the longitudinal member is at the same level as the point where each of the individual legs is attached.

The present invention permits a typical rib cut to come into closer contact with the rack. This decreases cooking time down to as little as 35 minutes while at the same time improves the evenness of the heat distribution. This in turn assures that the ribs will cook evenly with no burn spots and or raw areas. It also eliminates the need to pre-boil the ribs since the ribs can be cooked directly from their raw state to their done state.

These and other features of the present invention will be more fully understood by reference to the following drawings.

BRIEF DESCRIPTION OF THE DRAWINGS

FIG. 2A is a top plan view of the rack.

FIG. 2B is a bottom plan view of the rack.

FIG. 2E is a left side elevational view of the rack.

FIG. 2F is a right side elevational view of the rack.

FIG. 3A illustrates the manner in which the rack is initially preheated on a grill.

FIG. 3B illustrates the manner in which ribs are initially barbecued with the concave side of the ribs facing downward on the rack.

FIG. 3C illustrates the manner by which the ribs are rotated so that the convex surface of the ribs face downward and rest upon the flat portion of the rack.

DETAILED DESCRIPTION OF THE INVENTION

During the course of this description, like numbers will be used to identify like elements according to the different figures that illustrate the invention.

Figure 1:
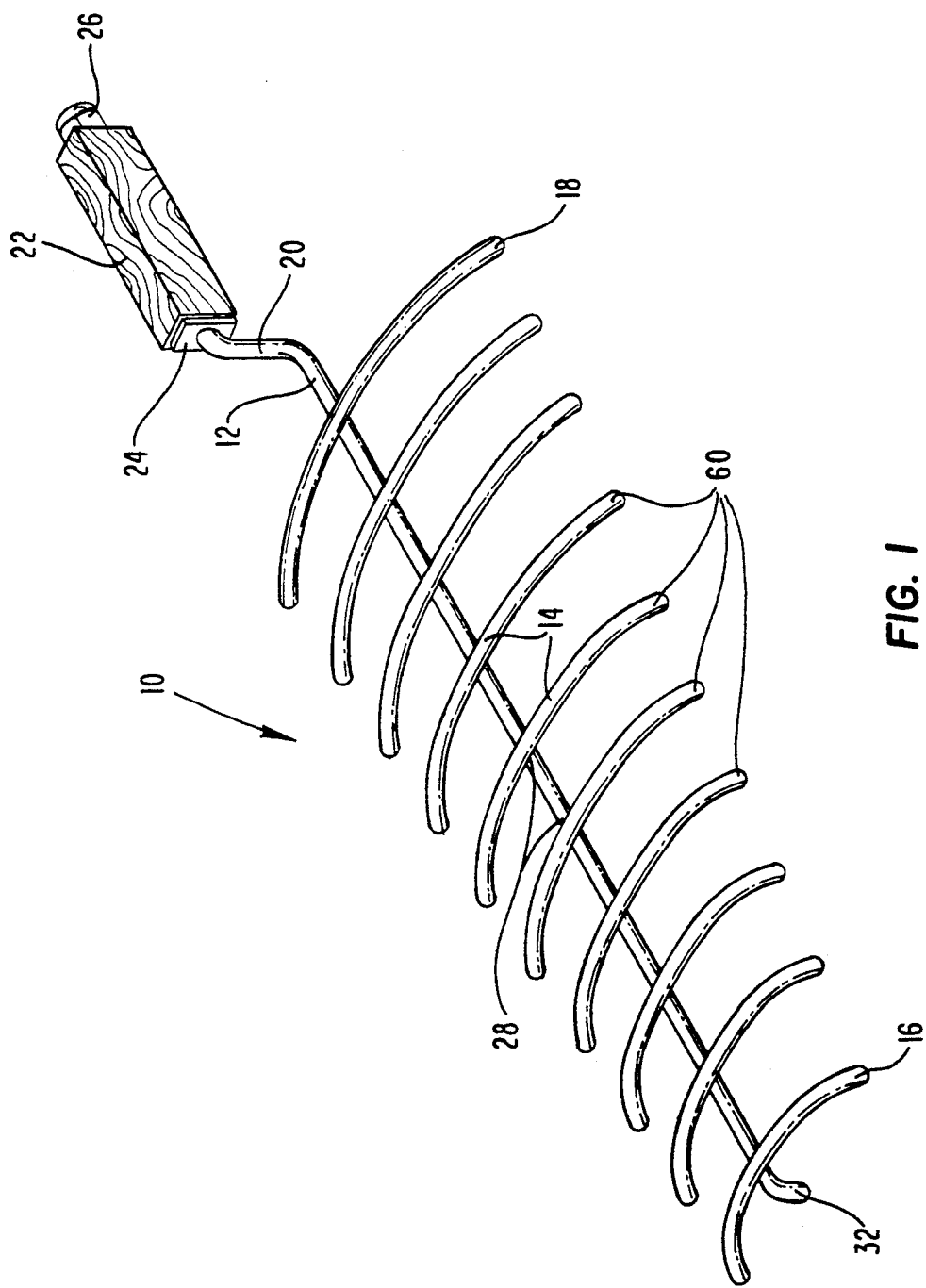
FIG. 1 is a front perspective view of the rack according to the preferred embodiment of the invention.
Figure 2C:
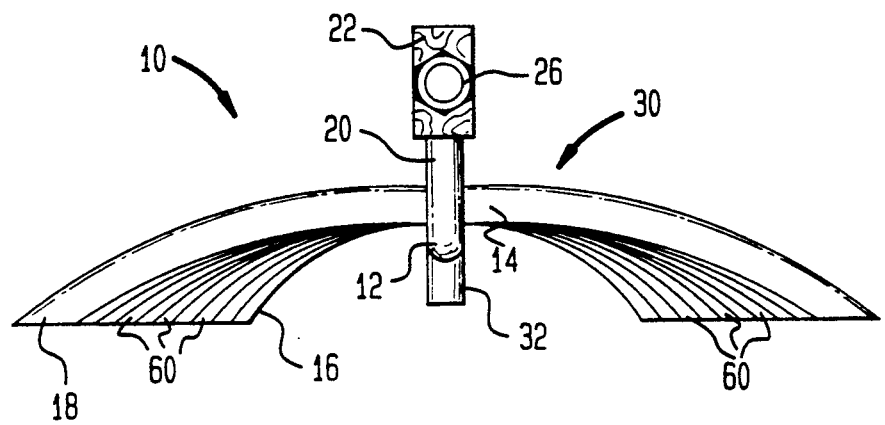
FIG. 2C is an end view of the rack as seen from the handle.
Figure 2D:
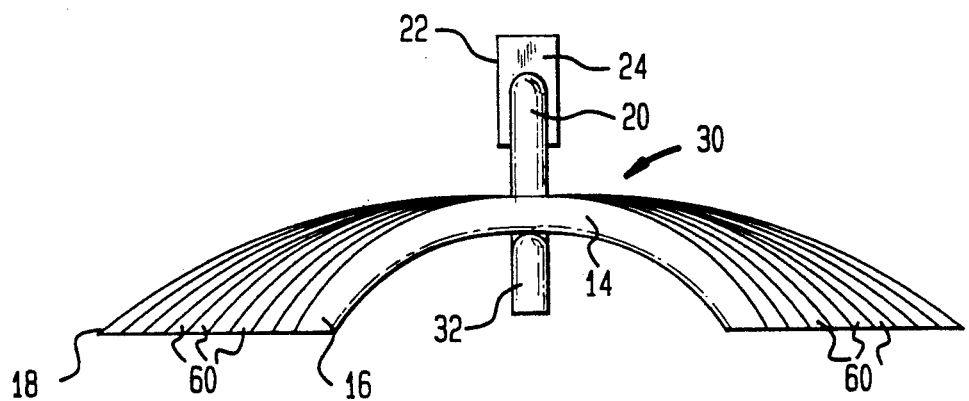
FIG. 2D is an end view of the rack as seen from the perspective of the shortest legs.

The preferred embodiment of the rack invention 10 is illustrated in the perspective view of FIG. 1 and in the orthogonal views of FIGS. 2A–2F. A longitudinal member 12, forms the spine or backbone, of the rack 10. Ten "C" shaped members 14 are welded to the upper side of the longitudinal member 12 so as to create twenty legs 60 which can rest upon the surface of a grill 34 such as illustrated in FIGS. 3A–3C. An insulated handle 22 is attached to one extreme end of the longitudinal member 12. A handle stop flange 24 and a nut 26 secure the handle 22 to the frame of the rack 10. A "Z" shaped kink 20 in the longitudinal member 12 separates the handle 22 from the legs 60.

Legs 60 are attached to longitudinal member 12 by welds 28. Welds 28 are located on the upper side of the longitudinal member 12. That is to say, the legs 60 are welded to that surface of longitudinal member 12 that faces up in the direction of the insulated handle 22. The distal end of the longitudinal member 12, furthest removed from insulated handle 22, comprises a turned down tip 32 which acts like a 21st leg for providing support to the rack 10 on the grill surface 34.

The rack 10 has a generally tapered shape. The shortest legs 16 are located near the distal tip 32 furthest removed from the insulated handle 22. Legs 60 become progressively longer the closer they get to handle 22, such that the longest legs 18 are located adjacent to the "Z" shaped kink 20 in the longitudinal member 12. A relatively flat portion 30 is located in the mid section of each of the "C" shaped members 14 and serves as a surface upon which barbecued ribs can rest in their inverted state.

The rack 10 preferably has a total length of about 26 inches. It is 9 inches wide at its widest portion across legs 18 and is approximately 4¾ inches wide at its narrowest portion across legs 16. Legs 60 and longitudinal member 12 are preferably formed from ⅜ inch round, high carbon, hot rolled, polished steel that is capable of withstanding temperatures in excess of 1500° F. An example of an acceptable material is C1045 which comprises a basic oxygen process steel in the higher carbon range. A rack 10 constructed in the foregoing manner weighs approximately 4 pounds. The legs 60 are first formed from the "C" shaped members 14 and then welded into place in order to create ten leg sets approximately 2 inches apart from center to center. The 2 inch spacing insures even cooking of the ribs. While twenty legs 60 comprise the preferred embodiment it is possible to have a greater or lesser number of legs. For example, the legs 60 could range from as few as six, and as many as thirty or more.

FIGS. 3A-3C illustrate the manner in which the rack 10 is employed to cook a side of ribs 38. A conventional side of barbecue ribs 38 typically includes a convex side 40 and a concave side 42. The cooking steps are as follows.

First, in FIG. 3A, the rack invention 10 is shown with the legs 60 contacting the flat surface of a grill 34. Charcoal briquettes 36 have been ignited underneath the rack 10 and grill 34. The rack 10 is normally not placed upon the grill 34 until after the flames from the charcoal ignitor fluid have burned down.

Second, the ribs 38 are placed on the rack 40 with the concave side 42 down and the convex side 40 up. The tapered concave surface 42 of the ribs 38 approximately follows the tapered convex surface of the rack 10. The ribs 38 are preferably not placed on rack 10 until after the coals have become red hot. Since the concave surface 42 closely follows the convex surface of the legs 60, the ribs 38 heat up and begin to cook very quickly. The even spacing of the legs 60 insures that the heat gets through evenly to the ribs 38. The 2 inch spacing between legs 60 is similar to the spacing between the bones on the barbecue ribs 38.

Third, it is desirable to periodically flip or rotate the ribs 38 so that the concave side 42 faces upwards and the convex side 40 faces downwards. The flat portion 30 on the top of the "C" shaped members 14 helps to balance the convex surface 40 of the ribs 38 when they are inverted. This prevents the ribs 38 from rolling off the rack 10.

The barbecue ribs 38 might be turned 4-6 times during a typical cooking session. Generally, meats such as pork spare ribs can be cooked in 30 to 35 minutes in most cases.

Figure 4:
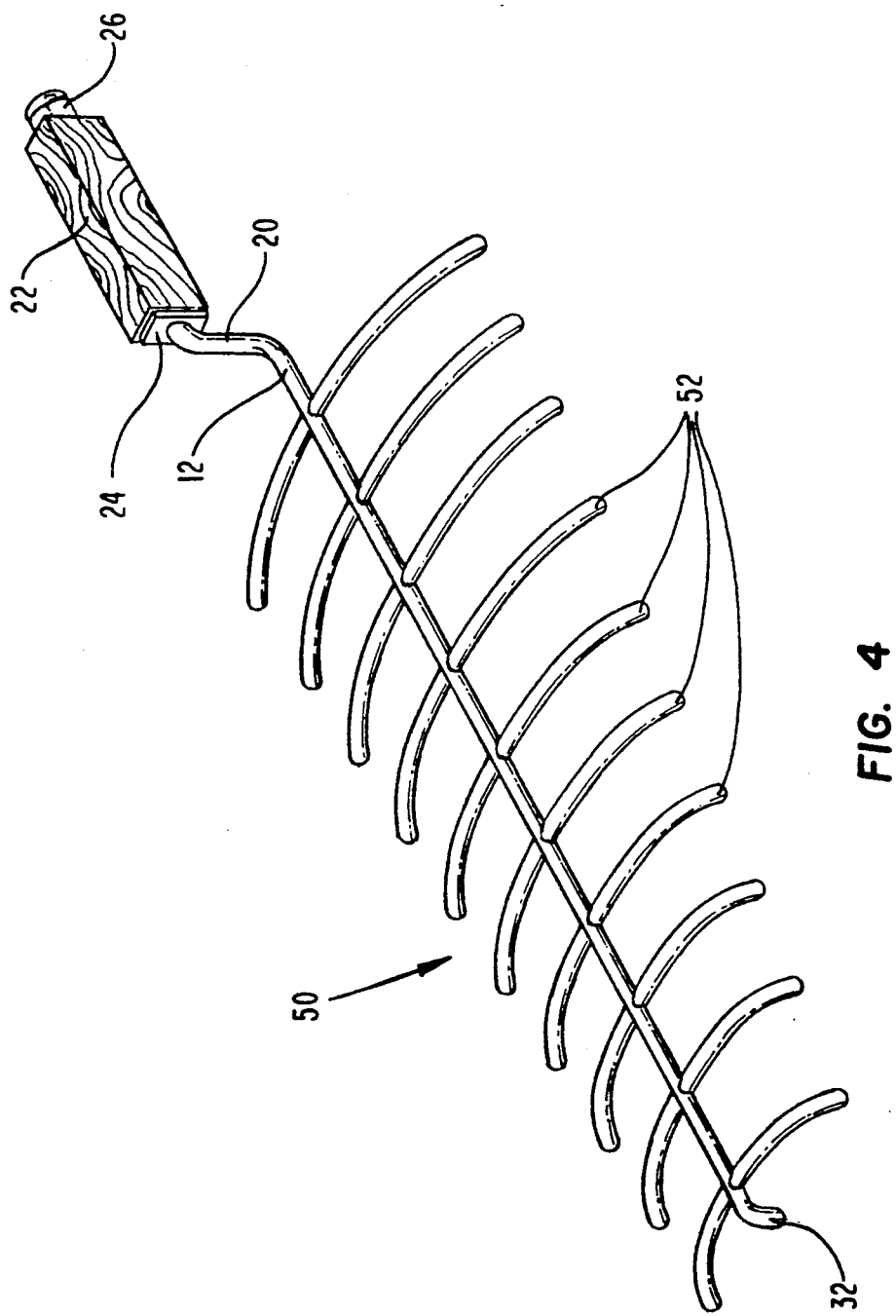
FIG. 4 is a perspective view of an alternative embodiment of the invention.

An alternative embodiment 50 of the present invention is illustrated in FIG. 4. Instead of forming the twenty legs 60 from ten "C" shaped members 14, the alternative embodiment 50 employs twenty "L" shaped leg sections 52, the ends of which are directly welded to the longitudinal member 12. "L" shaped leg sections 52 are welded not to the top or bottom of the longitudinal member 12 but rather to the sides thereof. This slightly reduces the mass of the rack 10 and brings the legs a little bit closer to the flame under the grill 34.

The present invention 10 has several advantages. First of all, it makes the cooking of ribs, such as pork spare ribs, a one-step process. In other words, it does not require additional implements or grills. Second, and very significantly, it reduces the cooking time by using both direct and indirect heating in a very intimate fashion. Third, barbecue rib burning is minimized because the ribs 38 are cooked evenly and for a minimal period of time. Fourth, the ribs 38 are thoroughly cooked because the legs 60 of the rack 10 evenly distribute intense heat to all portions of the ribs 38. Fifth, no preboiling of the ribs 38 is necessary since the ribs cook thoroughly in 30 to 35 minutes. Sixth, because the ribs are well and evenly cooked, additional seasoning is not as necessary.

While the invention has been described with reference to the preferred embodiment thereof, it will be appreciated by those of ordinary skill in the art that various changes can be made to the structure and materials that comprise the invention without departing from the spirit and the scope of the invention as a whole.

I claim:

1. An apparatus for cooking barbecue ribs on a grill comprising:
   a longitudinal member;
   an insulated handle attached to said longitudinal member;
   a plurality of curved legs of different lengths attached to said longitudinal member, said legs generally progressively decreasing in length as they increase in distance from said handle,
   where said ribs generally conform to the curved shape of said legs when said ribs are placed on said apparatus and said apparatus is placed on said grill.

2. The apparatus of claim 1 wherein said legs comprise a plurality of generally "C" shaped members attached at the center of said leg to said longitudinal member.

3. The apparatus of claim 1 wherein said legs comprise a plurality of individual legs attached at a first end to said longitudinal member and wherein a second end of said legs contact said grill.

4. The apparatus of claim 1 wherein said apparatus has between 6 and 30 individual curved legs.

5. The apparatus of claim 1 wherein said legs include a relatively flat portion at the center of said legs near the location where they are attached to said longitudinal member.

6. The apparatus of claim 5 wherein said legs are formed from a high carbon steel capable of standing temperatures in excess of 1500° and weighs approximately 4 pounds.

7. The apparatus of claim 6 wherein said apparatus has an overall length of approximately 26 inches, a maximum width of approximately 9 inches and a minimum width across the legs of approximately 4¾ inches.

* * * * *